United States Patent
Endoh et al.

(10) Patent No.: US 7,242,662 B2
(45) Date of Patent: Jul. 10, 2007

(54) OPTICAL RECORDING/REPRODUCING MEDIUM, MOTHER STAMPER FOR PRODUCING OPTICAL RECORDING/REPRODUCING MEDIUM AND OPTICAL RECORDING/REPRODUCING DEVICE

(75) Inventors: Sohmei Endoh, Tokyo (JP); Nobuhiro Nagano, Tokyo (JP); Jun Nakano, Tokyo (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 10/362,220

(22) PCT Filed: Jun. 26, 2002

(86) PCT No.: PCT/JP02/06442

§ 371 (c)(1),
(2), (4) Date: Jul. 10, 2003

(87) PCT Pub. No.: WO03/003362

PCT Pub. Date: Jan. 9, 2003

(65) Prior Publication Data

US 2004/0022162 A1 Feb. 5, 2004

(30) Foreign Application Priority Data

Jun. 29, 2001 (JP) .............................. 2001-199303
Feb. 12, 2002 (JP) .............................. 2002-34242

(51) Int. Cl.
*G11B 7/00* (2006.01)

(52) U.S. Cl. .................................. 369/275.4

(58) Field of Classification Search ............ 369/109.01
See application file for complete search history.

(56) References Cited

U.S. PATENT DOCUMENTS 5,745,475 A * 4/1998 Ohno et al. ............... 369/275.4
6,226,257 B1 * 5/2001 Morimoto ................. 369/275.4
6,577,590 B2 * 6/2003 Minamino et al. ....... 369/275.3
2003/0090986 A1 * 5/2003 Ichimura et al. ........ 369/112.24

FOREIGN PATENT DOCUMENTS

| EP | 905683 | | 3/1999 |
| EP | 0905683 | * | 3/1999 |
| EP | 939398 | | 9/1999 |
| JP | 2001-34948 | | 2/2001 |
| JP | 2001-126315 | | 5/2001 |

OTHER PUBLICATIONS

U.S. Appl. No. 10/508,089, filed Sep. 16, 2004, Endoh.
U.S. Appl. No. 10/845,112, filed May 14, 2004, Endoh et al.

* cited by examiner

*Primary Examiner*—Tan Dinh
*Assistant Examiner*—Peter Vincent Agustin
(74) *Attorney, Agent, or Firm*—Oblon, Spivak, McClelland, Maier & Neustadt, P.C.

(57) ABSTRACT

An optical recording and reproducing medium has grooves 2 formed along recording tracks and can be recorded and/or reproduced with irradiation of light L having a predetermined wavelength $\lambda$. When n assumes a refractive index of a medium extending from a light entrance end face to the grooves 2 of the optical recording and reproducing medium, a phase depth x of this groove 2 satisfies the following inequality:

$$\lambda/16.14n \leq x \leq \lambda/4.99n$$

and a ratio w/p between a width w of the groove 2 and a track pitch p satisfies the following inequality:

$$0.391 \leq (w/p) \leq 0.594$$

8 Claims, 4 Drawing Sheets

OPTICAL RECORDING/REPRODUCING MEDIUM, MOTHER STAMPER FOR PRODUCING OPTICAL RECORDING/REPRODUCING MEDIUM AND OPTICAL RECORDING/REPRODUCING DEVICE

TECHNICAL FIELD

The present invention relates to an optical recording and reproducing medium having grooves formed along recording tracks and which can be recorded and/or reproduced with irradiation of light having a predetermined wavelength, a mother stamper for use in manufacturing optical recording and reproducing mediums and an optical recording and reproducing apparatus.

BACKGROUND ART

Various kinds of disc-like optical discs that can be optically recorded and/or reproduced are now commercially available on the market as optical recording and reproducing mediums. As such optical discs, there are known a read-only optical disc in which embossed pits corresponding to data are formed on a disc substrate in advance, a magneto-optical disc for recording data through the use of magneto-optic effect and a phase change optical disc for recording data through the use of phase change of a recording film.

Of these optical discs, in the writable optical disc such as the magneto-optical disc and the phase change optical disc, it is customary that grooves extending along recording tracks are formed on a disc substrate. "Grooves" are what might be called guide grooves formed along the recording tracks to enable mainly tracking servo to be effected. An opening end between the grooves is referred to as a "land".

In the optical disc having the grooves formed thereon, tracking servo is effected in response to a tracking error signal based upon a push-pull signal obtained from light that had been reflected and diffracted on the grooves. The push-pull signal is obtained from two photodetectors when the two photodetectors symmetrically located at the center of track, for example, detect light reflected and diffracted on the grooves to calculate a difference between the outputs from the two photodetectors.

In these optical discs, high recording density has been achieved so far by increasing reproduction resolution of an optical pick-up mounted on a reproducing apparatus. From an optics standpoint, the reproduction resolution of the optical pick-up has been improved by shortening a wavelength $\lambda$ of laser light for use in reproducing data or by increasing a numerical aperture NA of an objective lens for use in focusing laser light on the optical disc.

In the respective formats of a so-called write once CD-R of CD (Compact Disc), a rewritable DVD-R of magneto-optical disc, a write once DVD-R of DVD (Digital Versatile Disc) and a rewritable DVD-RW of DVD (the above-mentioned disc names are all registered trademarks of optical discs), a groove recording format for recording data on the groove has been proposed so far. In the respective formats of magneto-optical discs conforming to the ISO system, a land recording format for recording data on the land has been proposed so far.

On the other hand, in the DVD-RAM (Random Access Memory) and so on, as a method for realizing a high-density optical disc, there has been proposed so far a land groove recording system in which track density can be increased twice as high as that of the prior art by recording data on both of the grooves and the lands.

High-density optical discs such as a DVR (Digital Video Recordable) that have been developed as next-generation optical discs in recent years and a so-called μ (micro) Disc which is a miniaturized MD whose disk diameter is reduced use the land groove recording system. FIG. 5 schematically shows an example of the proposed format of the land groove recording system in which a groove 2 wobbles, i.e. winds in synchronism with the adjacent groove 2. Reference numeral 9 denotes a land. This wobble signal generates a clock and is for use as a synchronizing signal and the like. Data information is recorded on the lands 9 and the grooves 2 and hence recording density twice as high as that of the prior art can be achieved.

However, when the optical disc such as the DVD-RAM uses the land groove recording system, if the focal points are not properly adjusted in the land recording and the groove recording upon recording and playback, respectively, then optimum optical recording and reproducing characteristics will not be obtained. There is presented a defect that an optical system will become complicated in structure.

As is reported in "ISOM 2000 Simulation Of Heat Generation And Conduction On Land/Groove Disc" in which recording beam shapes differ from each other in the land recording and in the groove recording, it is difficult to make the land recording and reproducing characteristic and the groove recording and reproducing characteristic become uniform. As a result, a problem arises in which the same optical recording and reproducing medium cannot avoid the regions which are different from each other in recording and reproducing characteristic.

Furthermore, we have experimental results in which while the high-density optical disc such as the DVR has a satisfactory recording and reproducing characteristic on the side near the read-out surface, i.e. in the case of the DVR, on the land near the side irradiated with light, it is difficult to hold a satisfactory recording and reproducing characteristic on the side distant from the read-out surface, i.e. in the case of the DVR, on the groove distant from the side irradiated with light.

While the optical disk such as a DVD-ROM (Read Only Memory) disk is able to directly record a signal by this land groove recording system format in the present situation, there is a demand for making recording and reproducing characteristics become satisfactory and uniform in the land recording and in the groove recording.

However, in the high-density optical disk such as the DVR, since the groove portions are distant from the read-out surface as described above, it is difficult to make the recording and reproducing characteristic on the groove portion become satisfactory.

On the other hand, in the manufacturing process of the optical recording and reproducing medium, there can be considered a manufacturing method for manufacturing an optical recording and reproducing medium by inverting concave and convex patterns formed on a disc substrate. Specifically, in the ordinary manufacturing process of the optical recording and reproducing medium, after very small concave and convex patterns had been formed on a photosensitive layer on a glass master by a suitable method such as photolithography, a master stamper made of Ni, for example, is formed by a suitable means such as plating.

Then, by an injection molding method for injection-molding this master stamper set on a mold and so on or by a so-called 2P (Photo-Polymerization) method for forming target concave and convex patterns by pressing the stamper against a resin layer obtained after a ultraviolet-curing resin had been coated on a disc substrate, it is possible to form an optical recording and reproducing medium substrate in which predetermined very small concave and convex patterns had been formed on the substrate.

Therefore, as described above, when the groove portions are formed on the side distant from the read-out surface so that satisfactory recording and reproducing characteristics cannot be held, a duplicate stamper of the above-mentioned master stamper, i.e. mother stamper is transferred and formed by a suitable method such as electroplating, whereby concave and convex patterns are inverted and groove patterns are formed on the disc substrate at its side near the read-out side to improve recording and reproducing characteristics.

However, when the optical disc uses the groove recording format or the land recording format, if high recording density similar to that obtained by the land groove recording format is achieved, then track density twice as high as track density obtained by the land groove recording format should be achieved, i.e. track pitch should be halved so that an amplitude amount of a tracking servo signal such as a push-pull signal is caused to decrease. As a result, stable tracking servo becomes difficult and reproduction of a wobble signal becomes also difficult.

In the land groove recording format, for example, a track pitch is 0.60 μm, i.e. a land width is 0.30 μm and a groove width is 0.30 μm, whereby an amplitude of a push-pull signal is approximately 90%.

However, when similar recording density is achieved by the groove recording format, if the track pitch is selected to be 0.32 μm, then the amplitude of the push-pulls signal is approximately 18%.

In the conventional optical disc, when the track pitch is selected to be approximately twice to ⅔ times the track pitch corresponding to a cut-off frequency of an optical pick-up of a reproducing apparatus, stable tracking servo can be realized and reproduction of a stable wobble signal can be realized, whereby an amplitude of a tracking servo signal can be obtained as sufficient level.

A cut-off frequency is a frequency at which an amplitude of a reproduced signal becomes approximately zero. When $\lambda$ assumes a wavelength of laser light for use in reproducing data and NA assumes a numerical aperture of an objective lens for focusing laser light on the optical disk, the cut-off frequency is expressed as $2NA/\lambda$.

In the case of the above-mentioned DVR, since the numerical aperture NA=0.85 and the reproduced light wavelength $\lambda$=406 nm, the cut-off frequency ($2NA/\lambda$) is expressed as 4187/mm and a corresponding track pitch is obtained as 0.239 μm.

If the track pitch of the DVR is selected to be 0.32 μm, then a resultant track pitch becomes approximately ⁴⁄₃ (0.32/0.239 is nearly equal to 1.339) so that a sufficient tracking servo signal amplitude, i.e. sufficient push-pull signal amplitude cannot be obtained.

While the recent high-density optical disk uses a push-pull signal as a tracking error signal, in order to carry out tracking servo stably, a push-pull signal amplitude ratio should be large sufficiently. For example, a push-pull signal amplitude ratio should be selected to be approximately larger than 0.14 by a means such as adjustment of focus position for maximizing a push-pull signal amplitude. Furthermore, it is also requested that a wobble signal should be reproduced stably.

SUMMARY OF THE INVENTION.

Objects of the present invention are to provide an optical recording and reproducing medium with practical high recording density, a mother stamper for manufacturing an optical recording and reproducing medium and an optical recording and reproducing apparatus in which the above-mentioned problems can be solved, recording and reproducing characteristics can be prevented from being fluctuated, a sufficient push-pull signal amplitude can be obtained in order to carry out stable tracking servo and in which a wobble signal can be reproduced stably.

According to the present invention, there is provided an optical recording and reproducing medium having grooves formed along recording tracks and which can be recorded and/or reproduced with irradiation of light having a predetermined wavelength $\lambda$. This optical recording and reproducing medium is characterized in that, when n assumes a refractive index of a medium extending from a light entrance end face to the grooves of the optical recording and reproducing medium, a phase depth x of the groove satisfies the following inequality:

$$\lambda/16.14n \leq x \leq \lambda/4.99n$$

and that a ratio w/p of a groove width w and a track pitch p satisfies the following inequality:

$$0.391 \leq (w/p) \leq 0.594$$

or that the phase depth x of the grooves satisfies the following inequality:

$$\lambda/2.77n \leq x \leq \lambda/2.41n$$

and that the ratio w/p of the groove width w and the track pitch p satisfies the following inequality:

$$0.422 \leq (w/p) \leq 0.578$$

According to the present invention, in the optical recording and reproducing medium having the above-mentioned arrangement, at least a recording layer and a protective layer are formed on a substrate in which the grooves are formed and the groove includes an upper surface projecting to the side near the light entrance end face and the upper surface of this groove serves as an information surface in which information is recorded and reproduced.

Furthermore, according to the present invention, in the optical recording and reproducing medium having the above-mentioned arrangement, the grooves are formed as wobbling grooves.

Further, according to the present invention, in the optical recording and reproducing medium having the above-mentioned arrangement, the track pitch is selected to be greater than 300 nm and less than 325 nm.

Furthermore, according to the present invention, when NA assumes a numerical aperture of an objective lens for use in recording and/or reproducing the optical recording and reproducing medium, this NA lies in the range of 0.85±0.05.

According to the present invention, there is provided an optical recording and reproducing medium manufacturing mother stamper for use in manufacturing an optical recording and reproducing medium having grooves formed along recording tracks and which can be recorded and/or reproduced with irradiation of light having a predetermined wavelength $\lambda$. This optical recording and reproducing medium manufacturing mother stamper is characterized in that, when n assumes a refractive index of a medium extending from a light entrance end face to the grooves of the optical recording and reproducing medium, a phase depth x' of a groove pattern corresponding to the grooves satisfies the following inequality:

$$\lambda/16.14n \leq x' \leq \lambda/4.99n$$

and that a ratio w'/p' between a groove pattern width w' and a track pitch p' satisfies the following inequality:

$$0.391 \leq (w'/p') \leq 0.594$$

or that the phase depth x' of the groove pattern satisfies the following inequality:

$$\lambda/2.77n \leq x' \leq \lambda/2.41n$$

and that the ratio w'/p' of the groove pattern width w' and the track pitch p' satisfies the following inequality:

$$0.422 \leq (w'/p') \leq 0.578$$

Further, in the optical recording and reproducing medium according to the present invention, the substrate is transfer-molded by the above-mentioned optical recording and reproducing medium manufacturing mother stamper, at least a recording layer and a protective layer are formed on this substrate, the above-mentioned groove has an upper surface projecting toward the side near the light entrance end face and this upper surface is formed as an information surface on and from which information can be recorded and reproduced.

Furthermore, the optical recording and reproducing apparatus according to the present invention records and reproduces information on and from the optical recording and reproducing medium having the above-mentioned arrangement at its only upper surface near the light entrance end face of the groove.

As described above, according to the present invention, the groove of the optical recording and reproducing medium is formed as the wobbling groove and the phase depth is set so as to satisfy the following inequality:

$$\lambda/16.14n \leq x \leq \lambda/4.99n$$

and the ratio w/p between the groove width w and the track pitch p is set so as to satisfy the following inequality:

$$0.391 \leq (w/p) \leq 0.594$$

whereby a sufficient push-pull signal amplitude could be obtained.

Alternatively, the phase depth x of the groove is set so as to satisfy the following inequality:

$$\lambda/2.77n \leq x \leq \lambda/2.41n$$

and the ratio w/p of the groove width w and the track pitch p is set so as to satisfy the following inequality:

$$0.422 \leq (w/p) \leq 0.578$$

whereby a sufficient push-pull signal amplitude could be obtained stably.

Further, according to the present invention, in the optical recording and reproducing medium having the above-mentioned arrangement, since at least the recording layer and the protective layer are formed on the substrate in which the grooves are formed, the groove includes the upper surface projecting toward the side near the light entrance end face, i.e. the groove is formed near the side from which information is read out and the upper surface of this groove is formed as the information surface on and from which information is recorded and reproduced, recording and reproducing characteristics can be prevented from being fluctuated unlike the case of the land groove recording system and the reproducing optical system of the optical recording and reproducing apparatus can be avoided from becoming complicated in structure. Furthermore, when the track pitch is selected to be greater than 300 nm and less than 325 nm, recording density substantially as high as that obtained by the aforementioned land groove recording system can be obtained and hence it is possible to provide the optical recording and reproducing medium or the optical recording and reproducing apparatus in which the stable recording and reproducing characteristic can be obtained.

BEST MODE FOR CARRYING OUT THE INVENTION

Embodiments of the present invention will be described below in detail with reference to the drawings. It is needless to say that the present invention is not limited to the following embodiments and that the present invention can take various modifications without departing from the arrangement of the present invention.

Figure 1:
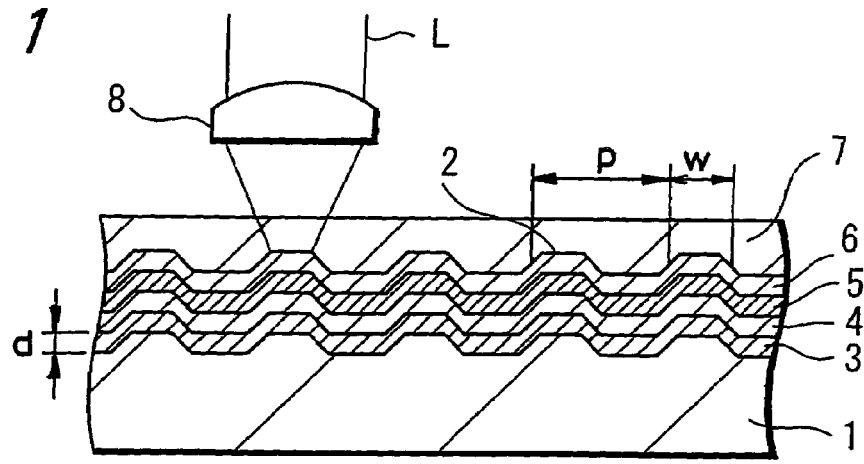
FIG. 1 is a cross-sectional view showing part of an example of an optical recording and reproducing medium according to the present invention in an enlarged-scale.

FIG. 1 is a cross-sectional view schematically showing an arrangement of part of an example of an optical recording and reproducing medium according to the present invention in an enlarged-scale. As shown in FIG. 1, in this embodiment, grooves 2 that project to the side near the light entrance end face, in the illustrated example, to the upper side are formed on a substrate 1. On the substrate, there are laminated a reflective layer 3, a first dielectric layer 4, a recording layer 5, a second dielectric layer 6 and a transmission protective layer 7, in that order, to thereby construct an optical recording and reproducing medium.

Reference numeral 8 denotes an optical pick-up such as an objective lens. Reproducing light L such as laser light is irradiated on the grooves 2 to read out information from the upper surfaces of the grooves 2.

Then, in particular, according to the present invention, when d assumes a depth (equivalent to a height in the illustrated example) of the above-mentioned groove 2, λ assumes a wavelength of reproducing light shown by the laser light L in FIG. 1 and n assumes a refractive index of the protective layer 7 in the example shown in FIG. 1, a phase depth x that is expressed by $\lambda/(d \cdot n)$ should satisfy the following inequality:

$$\lambda/16.14n \leq x \leq \lambda/4.99n$$

Further, a ratio w/p of a width w of the groove 2 and a track pitch p should satisfy the following inequality:

$$0.391 \leq (w/p) \leq 0.594$$

Alternatively, the phase depth x of the groove 2 should satisfy the following inequality:

$$\lambda/2.77n \leq x \leq \lambda/2.41n$$

Further, the ratio w/p of the width w of the groove 2 and the track pitch p should satisfy the following inequality:

$$0.422 \leq (w/p) \leq 0.578$$

Next, an example of a manufacturing process of an optical recording and reproducing medium according to the present invention will be described with reference to FIGS. 2A to 2C that are manufacturing process diagrams of examples of a mother stamper for manufacturing an optical recording and reproducing medium.

Figure 2A:
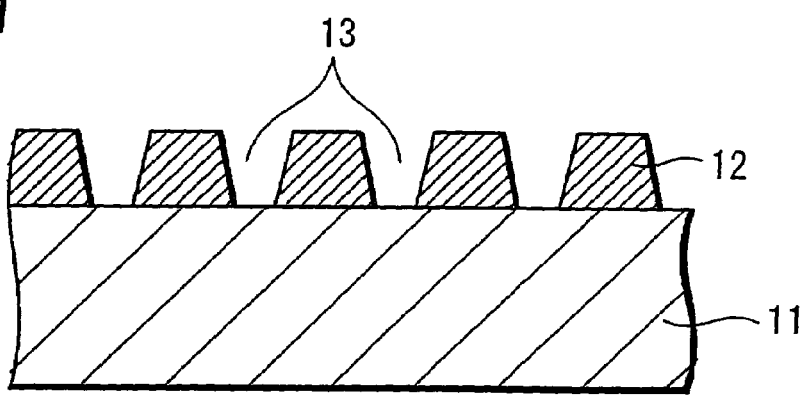
FIGS. 2A, 2B and 2C are process diagrams showing examples of a mother stamper manufacturing process for manufacturing an optical recording and reproducing medium according to the present invention, respectively.

In FIG. 2A, reference numeral 11 denotes a master substrate made of a suitable material such as glass. A photosensitive layer 12 made of a suitable material such as photoresist is deposited on the surface of this master substrate 11 and groove patterns 13 corresponding to wobbling patterns, for example, are formed so as to expose the surface of the master substrate 11, i.e. formed as so-called concave patterns from which the photosensitive layer 12 had been removed by predetermined pattern exposure and development which will be described later on.

Then, although not shown, after a conductive film made of a suitable material film such as nickel coating had been formed on the whole surface of the photosensitive layer 12 thus patterned by a suitable method such as nonelectrolytic plating, the master substrate 11 with the conductive film deposited thereon is attached to an electroforming system, whereafter a nickel-plating layer having a film thickness of about 300±5 μm is formed on the conductive film layer by electroplating.

Figure 2B:
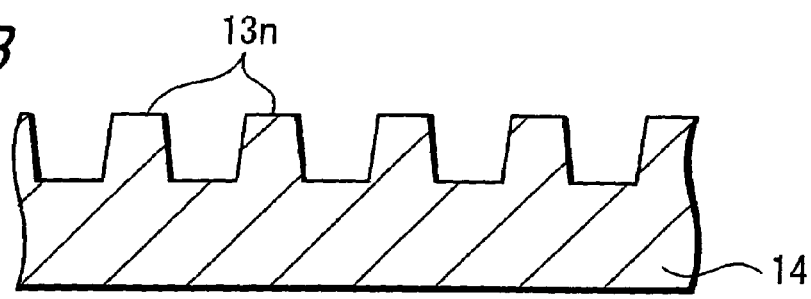

Subsequently, the nickel-plating layer is released from the master substrate 11 with the thick nickel-plating layer deposited thereon by a suitable means such as a cutter and the photosensitive layer with concave and convex patterns formed thereon is rinsed by suitable solution such as acetone, whereby a stamper 14 in which inverted wobbling groove patterns 13n that result from inverting the wobbling groove patterns 13 on the master disk 11, i.e. so-called master stamper is formed as shown in FIG. 2B.

Figure 2C:
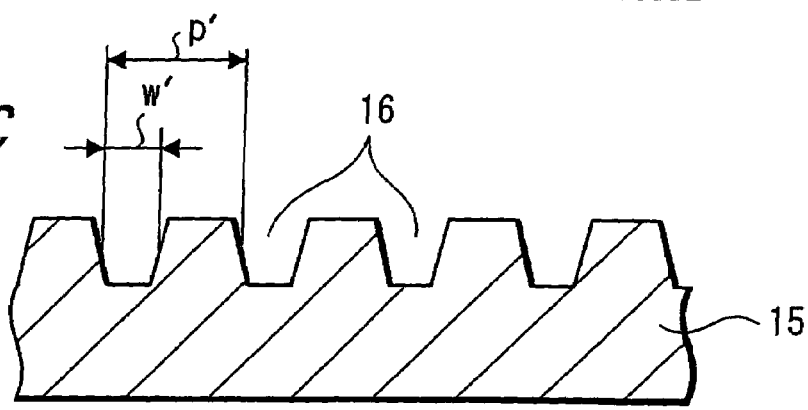

Then, after a releasing agent, for example, had been coated on the surface of this stamper 14 in which the concave and convex patterns are formed, there is formed a mother stamper 15 to which the concave and convex pattern of the stamper 14 had been transferred by electroplating as shown in FIG. 2C.

This mother stamper 15 have predetermined wobbling groove patterns 16 formed thereon similarly to the patterns of the photosensitive layer 12 on the master substrate 11 that had been described with reference to FIG. 2A.

According to the present invention, in this mother stamper 15, when λ assumes a wavelength of reproducing light and n assumes a refractive index of a protective layer formed on a substrate of an optical recording and reproducing medium formed from this mother stamper 15, a phase depth x' of the groove patterns 16 should satisfy the following inequality:

$$\lambda/16.14n \leq x' \leq \lambda/4.99n$$

Further, a ratio w'/p' of a width w' of the groove pattern 16 and a track pitch p' should satisfy the following inequality:

$$0.391 \leq (w'/p') \leq 0.594$$

Alternatively, the phase depth x' should satisfy the following inequality:

$$\lambda/2.77n \leq x' \leq \lambda/2.41n$$

Further, the ratio w'/p' of the groove w' of the groove pattern 16 and the track pitch p' should satisfy the following inequality:

$$0.422 \leq (w'/p') \leq 0.578$$

Next, the specific exposure process of the optical recording and reproducing medium manufacturing master that had been described so far with reference to FIG. 2A will be described with reference to FIG. 3 in detail in conjunction with an example of an arrangement of an optical recording apparatus.

First, the arrangement of this optical recording apparatus will be described.

The above-mentioned pattern exposure process generally uses a method of exposing the photoresist on the master substrate by laser beams after laser beams had been focused by an objective lens. FIG. 3 is a block diagram schematically showing an arrangement of an example of such optical recording apparatus.

Figure 3:
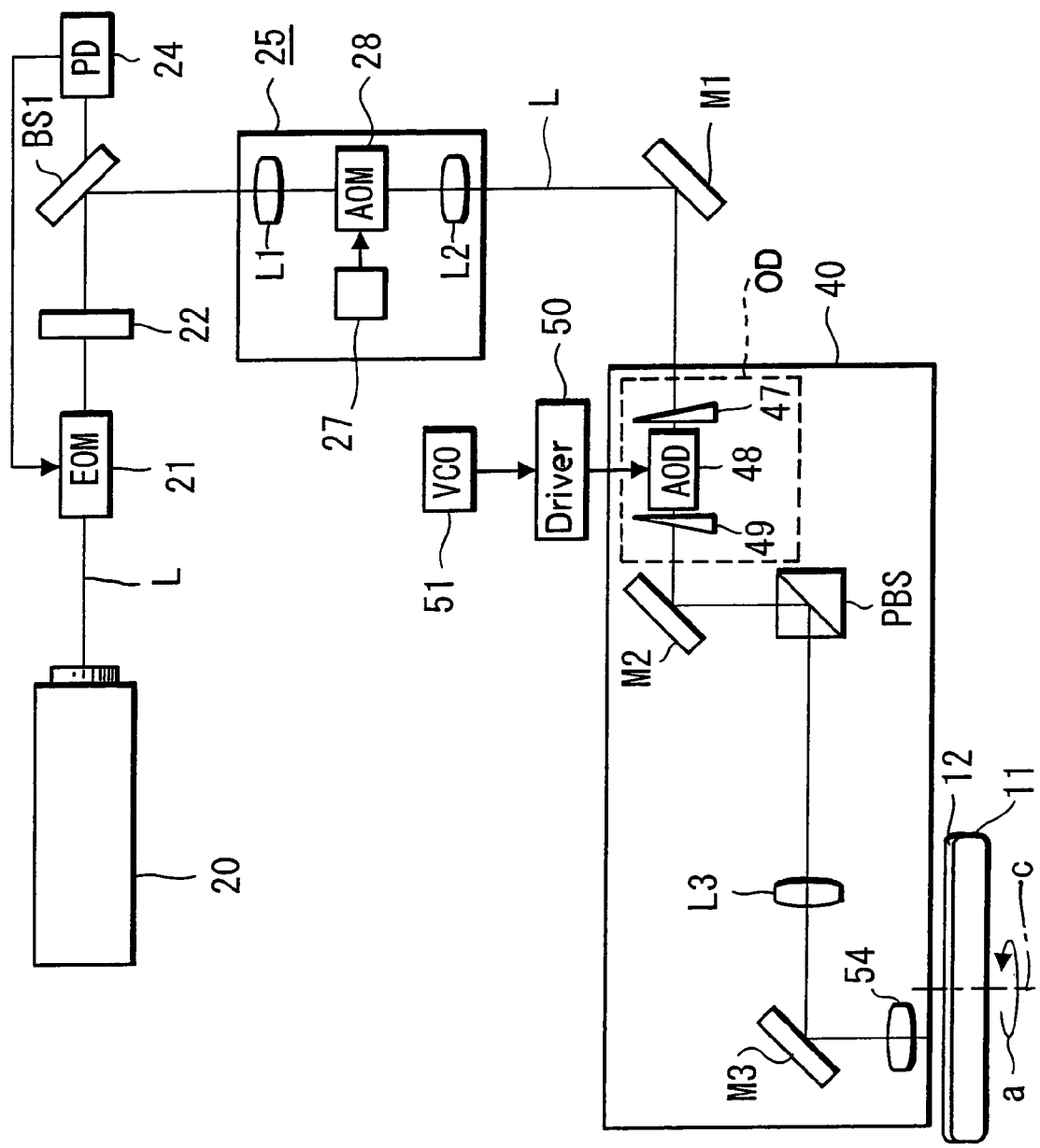
FIG. 3 is a block diagram schematically showing an arrangement of an example of an optical recording apparatus.

In FIG. 3, reference numeral 20 denotes a light source such as a gas laser. Although a light source is not limited to a particular light source and a proper light source can be selected and used, a laser light source for emitting recording laser light of Kr laser (wavelength λ=351 nm) was used in the inventive examples which will be described later on.

Laser light emitted from the above-mentioned laser light source is passed through an electro-optic modulator (EOM) 21 and an analyzer 22 and partly reflected by a beam splitter BS1. Laser light that had passed through the beam splitter BS1 is detected by a photodetector (PD) 24 and supplied to a control unit such as a recording light power control circuit, though not shown, in which it is compared with a comparison voltage Ref and fed back to the electro-optic modulator 21 and thereby held at constant power level.

The laser light reflected on the beam splitter BS1 is introduced into a modulation unit 25. In the modulation unit 25, laser light is focused by a lens L1 and an acoustooptic modulator 28 composed of AOM (Acousto-Optic Modulator: acousto-optic modulation element) is located on the focal plane.

Ultrasonic waves corresponding to a recording signal are inputted from a driver 27 to this acoustooptic modulator 28 which modulates intensity of laser light based upon ultrasonic waves. Laser light is diffracted by a diffraction grating of the acoustooptic modulator 28 and only first-order diffracted light of diffracted light passes through the slit.

The first-order diffracted light that had been modulated in intensity is focused by a lens L2 and reflected by a mirror M1 such that its traveling direction is bent 90°, whereafter it is introduced into a moving optical table 40 in the horizontal direction along the optical axis.

In the case of the pattern in which grooves are formed as wobbling grooves, laser light introduced into the moving optical table 40 is optically polarized by a polarization optical system OD and reflected by a mirror M2 such that its traveling direction is again bent 90°, whereafter it is introduced into a polarizing beam splitter PBS.

When the optical recording and reproducing medium is manufactured, if pits are formed on part of so-called recording areas forming grooves, for example, or the outside of this recording area, for example, inner peripheral portions, then laser light is not optically polarized, reflected by the mirror M2 and introduced into the polarizing beam splitter PBS and thereby a target pit pattern can be formed by inputting an ON/OFF signal corresponding to a predetermined pattern from the above-mentioned driver 27, for example.

The laser light whose traveling direction had been again bent 90° by the polarizing beam splitter PBS is magnified to have a predetermined beam diameter by a magnifying lens L3, reflected by a mirror M3, introduced into an objective lens 54 and focused on the photosensitive layer 12 on the master substrate 11 by this objective lens 54. The master substrate 11 is rotated by a rotation drive means, not shown, as shown by an arrow a. A dash-and-dot line c represents the central axis of the substrate 11.

The moving optical table 40 moves recording laser light L in the parallel direction to thereby form a latent image corresponding to uneven patterns responsive to the traces of the irradiated laser light on the whole surface of the photosensitive layer 12.

The deflection optical system OD is comprised of a wedge prism 47, an acoustooptic deflector (AOD: Acousto Optical Deflector) 48 and a wedge prism 49. Laser light L is introduced through the wedge prism 47 into the acoustooptic deflector 48 and is optically deflected in response to a desired exposure pattern by this acoustooptic deflector 48.

An acoustooptic element made of tellurium dioxide may be suitable for use as an acoustooptic element used in this acoustooptic deflector 48. The laser light L that had been optically deflected by the acoustooptic deflector 48 is emitted from the deflection optical system OD through the wedge prism 49.

The wedge prisms 47, 48 function to enable the laser light L to become incident on the lattice surface of the acoustooptic element of the acoustooptic deflector 47 so as to satisfy Bragg condition and also function to prevent a height of beam in the horizontal direction from being changed even when the laser light L is optically deflected by the acoustooptic deflector 48. In other words, these wedge prisms 47, 49 and the acoustooptic deflector 48 are located in such a manner that the laser light L may become incident on the lattice surface of the acoustooptic element of the acoustooptic deflector 48 so as to satisfy Bragg condition and that the height of laser light can be prevented from being changed when the laser light is emitted from the deflection optical system OD.

The acoustooptic deflector 48 has a driving driver 50 for driving this acoustooptic deflector 48 being attached thereto. A high-frequency signal from a voltage-controlled oscillator (VCO: Voltage Controlled Oscillator) 51 is modulated by sine waves and supplied to the driving driver 50. Then, when the photosensitive layer is exposed, a signal corresponding to a desired exposure pattern is inputted to the driving driver 50 from the voltage-controlled oscillator 51 and the driving driver 50 drives the acoustooptic deflector 48 in response to this signal, whereby the laser light L is optically deflected in response to a desired wobbling frequency.

Specifically, when address information is added to the grooves by wobbling the grooves in response to a frequency of 956 kHz, a sine wave signal is supplied from the voltage-controlled oscillator 51 to the driving driver 50 in response to a control signal having a frequency of 956 kHz which is a high-frequency signal having a center frequency of 224 MHz.

Then, the driving driver 50 drives this acoustooptic deflector 48 in response to this signal to change a Bragg angle of the acoustooptic element of this acoustooptic deflector 48, thereby optically deflecting laser light so as to correspond to the grooves wobbled by the signal having the frequency of 956 kHz. As a consequence, the laser light is optically deflected in such a manner that the position of spots of laser light focused on the photosensitive layer may be vibrated in the radius direction at a frequency of 956 kHz with amplitude of ±10 nm.

The polarizing beam splitter PBS reflects S-polarized light and passes P-polarized light. The laser light that had been optically deflected is S-polarized light and reflected by the polarizing beam splitter PBS.

While the numerical aperture NA of the objective lens may fall within a range of 0.85±0.05, the numerical aperture NA of the objective lens was selected to be 0.85 in the inventive examples which will follow. Tellurium oxide was used as the AOM of the acoustooptic modulator 28. A signal supplied from the input terminal to the driver 27 is a DC (direct current) signal that is held at constant level when grooves are formed. In this example, with respect to the optical lenses comprising the modulation optical system 25, a focal length of the condenser lens L1 was selected to be 80 mm, a focal length of the collimator lens L2 was selected to be 100 mm and a focal length of the magnifying lens L3 in the moving optical table 40 was selected to be 50 mm.

Under exposure conditions in the optical recording apparatus having the above-mentioned arrangement in which linear velocity for wobbling grooves was 5.28 m/s, laser power was approximately 0.4 mJ/m and a track pitch was 320 nm, pattern exposure is effected on the photosensitive layer 12 on the master substrate 11.

Subsequently, this master substrate 11 is placed on a turntable of a developer such that the photosensitive layer 12 may be oriented in the upper direction. In this condition, this master substrate is rotated such that the surface of this master substrate 11 may become the horizontal plane. In this condition, developing solution is dripping on the photosensitive layer 12 and the photosensitive layer 12 is developed, whereby concave and convex patterns are formed based upon a recording signal and the master for manufacturing the optical recording and reproducing medium that had been described with reference to FIG. 2A is formed.

Thereafter, by the manufacturing process that had been described so far with reference to FIGS. 2B to 2C, there is formed a mother stamper for manufacturing the optical recording and reproducing medium in which concave and convex patterns similar to those manufactured by the pattern exposure and the development process in the above-mentioned optical recording apparatus are formed. Further, an optical recording and reproducing substrate made of a transmission resin such as polycarbonate is molded from this mother stamper by a suitable method such as an injection molding method or a 2P method, in this embodiment, injection molding.

In the inventive examples which will be described later on, the thickness of the molded substrate is selected to be 1.1 mm, and the reflective layer 3 made of an Al alloy, the first dielectric layer 4 made of a suitable material such as ZnS—SiO$_2$, the recording layer 5 made of a phase-change material such as GeSbTe alloy and the second dielectric layer 6 made of a suitable material such as ZnS—SiO$_2$ are deposited on the signal forming surface, in that order, by a suitable method such as sputtering. Thereafter, an ultraviolet-curing resin is coated on the second dielectric layer 5 by spin-coating and the protective layer 7 having the thickness of 0.1 mm is formed by curing this ultraviolet-curing resin with ultraviolet rays. The optical recording and reproducing medium having the DVD type arrangement is formed by the above-mentioned process.

Figure 4:
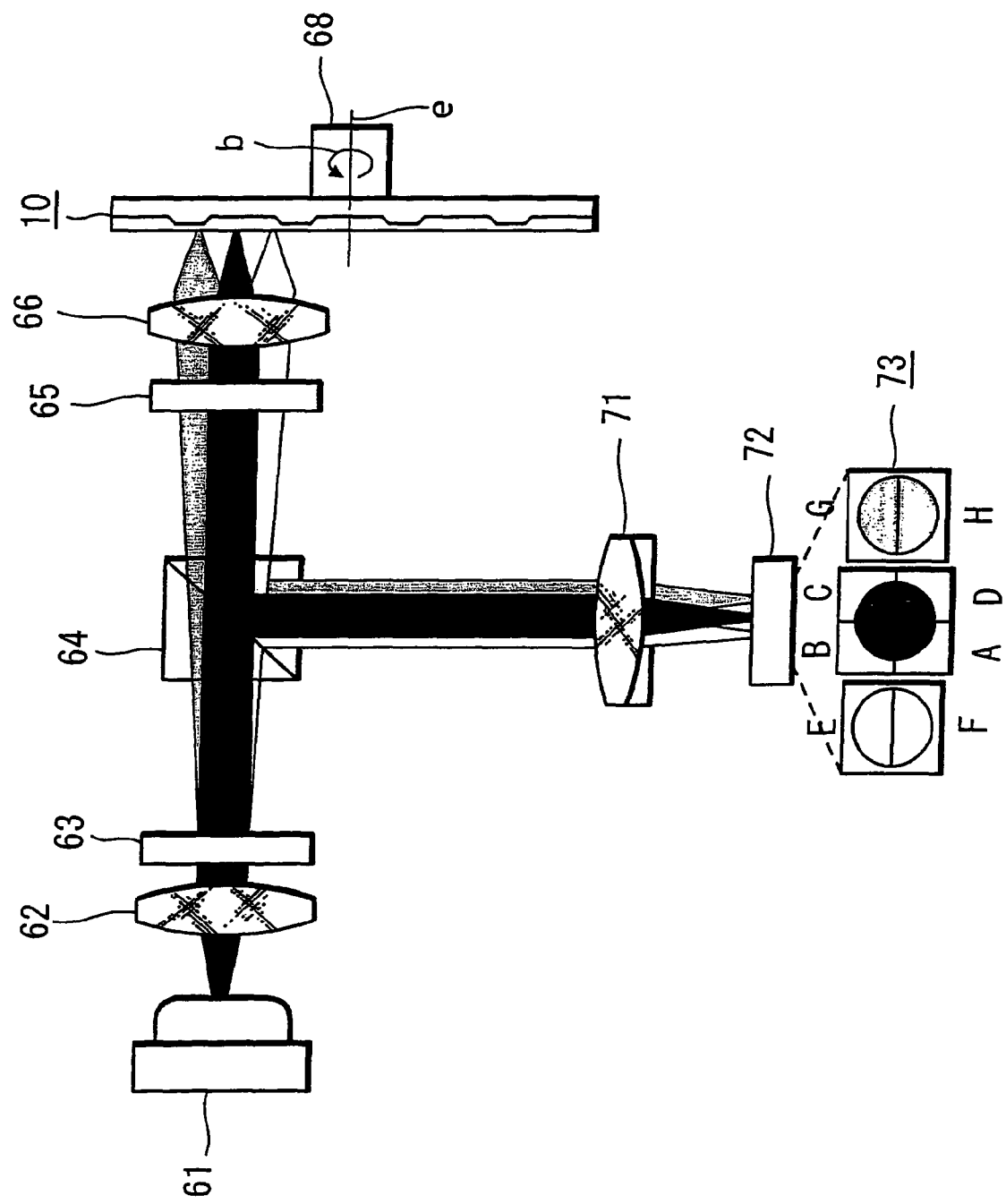
FIG. 4 is a diagram schematically showing an arrangement of an example of an optical recording and reproducing apparatus according to the present invention.
Figure 5:
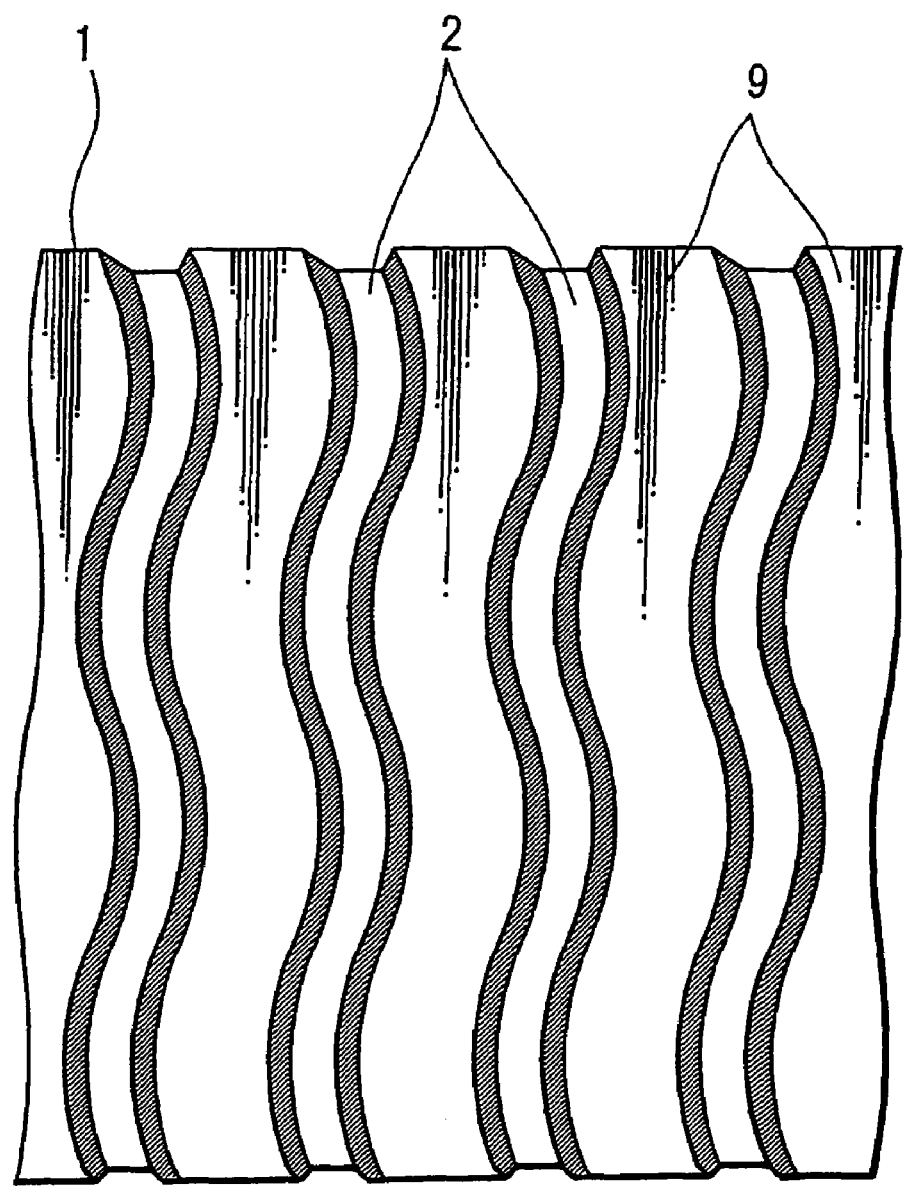
FIG. 5 is a plan view showing part of an example of an optical recording and reproducing medium according to the prior art in an enlarged-scale.

Reproducing characteristics of the concave and convex patterns of the optical recording and reproducing medium thus formed were evaluated through the use of an optical recording and reproducing apparatus including an optical system in which a wavelength λ was 406 nm and a numerical aperture NA was 0.85. FIG. 4 is a diagram showing a schematic arrangement of this apparatus.

In FIG. 4, reference numeral 61 denotes a light source such as a semiconductor laser having a wavelength λ=406 nm. Laser beam emitted from this light source is collimated into collimated light by a collimator lens 62. A grating 63 separates the collimated light into three beams of 0th-order light beam (main beam) and ±first-order light beams (sub-beams). The three beams (P-polarized lights) are passed through a polarizing beam splitter (PBS) 64 and a quarter-wave plate 65 as circularly-polarized light and focused on a predetermined recording track of an optical recording and reproducing medium by an optical pick-up 66 composed of an objective lens having a numerical aperture NA=0.85. The center spot of the main beam is used to record and reproduce recording information and optical spots of the sub-beams are used to detect tracking error. In FIG. 4, reference numeral 68 denotes a rotation means that can rotate the optical recording and reproducing medium 10 as shown by an arrow b, and a solid line e denotes a rotary shaft of this optical recording and reproducing medium 10.

Then, reflected light from the optical recording and reproducing medium 10 is supplied through the optical pick-up 66 to the quarter-wave plate 65 by which circularly-polarized light is converted into S-polarized light and reflected on the polarizing beam splitter 64, whereafter it is introduced into a compound lens 71.

Laser light incident on the compound lens 71 is introduced into a photodiode 72 through a lens that gives astigmatism to laser beams, in which it is converted into an electrical signal corresponding to intensity of laser beam and outputted to a servo circuit (not shown) as servo signals (focusing error signal and tracking error signal). The photodiode 72 includes divided detectors 73 (A to H). Reflected-back light of the main beam is introduced into the quadrant detectors A to D located at the central portion of the detectors 73. Reflected-back lights of the sub-beams are introduced into the detectors E to H located at both side portions of the detectors 73.

The signals A to H outputted from the detectors A to H of the detectors 73 are added and subtracted through the use of a predetermined circuit system, not shown, by the following method and thereby a predetermined signal is outputted. In this example, a tracking servo signal was obtained by a differential push-pull (DPP: Differential Push-Pull) system using the above-mentioned three laser lights located at predetermined intervals for irradiation. Specifically, Reproduced signal of optical recording and reproducing medium=(A+B+C+D)

Pit reproduced signal (e.g. EFM signal)=(A+B+C+D)

Push-pull signal=(B+C)−(A+D)

Differential push-pull signal (tracking servo) signal=(B+C)−(A+D)−k ((E−F)+(G−H))

(k is a predetermined constant)

The optical recording and reproducing apparatus having the above arrangement has evaluated the optical recording and reproducing mediums having the above-mentioned arrangements in the following inventive examples.

INVENTIVE EXAMPLES

In the following inventive examples, while the thickness of the photosensitive layer 12 is being controlled by changing materials of the photosensitive layer 12, in this case, dilution ratios of materials of photoresist and revolution rates of spin-coating required when the resist is coated, optical recording and reproducing mediums A to F having groove depths of 17 nm, 20 nm, 23 nm, 34 nm, 47 nm, 55 nm were manufactured by the above-mentioned processes.

Further, while recording light power required when master discs of respective optical recording and reproducing mediums are manufactured is being changed, the optical recording and reproducing mediums in which groove width are changed in a range of from 125 nm to 220 nm were manufactured and push-pull signals of the respective optical recording and reproducing mediums were measured. Measured results are shown on the following table 1. A wavelength λ of reproduced light is 406 nm and a refractive index of the protective layer 7 is 1.48 as described above. On the table 1, columns in which a signal amount is not described represent that optical recording and reproducing mediums could not be reproduced.

TABLE 1

| Depths of grooves (nm) | Phase depth $\lambda/(d \cdot n)$ | Groove width [nm] (numerical values in parentheses show groove width/track pitch) | | | |
|---|---|---|---|---|---|
| | | 125 (0.391) | 160 (0.5) | 190 (0.594) | 220 (0.688) |
| A | 17 | 16.14 | 0.14 | 0.15 | 0.14 | — |
| B | 20 | 13.71 | 0.16 | 0.165 | 0.16 | — |
| C | 23 | 11.93 | 0.175 | 0.185 | 0.18 | 0.155 |
| D | 34 | 8.07 | 0.21 | 0.22 | 0.21 | 0.185 |
| E | 47 | 5.84 | 0.2 | 0.2 | 0.2 | 0.18 |
| F | 55 | 4.99 | 0.15 | 0.165 | 0.15 | 0.14 |

As mentioned before, the amplitude of the push-pull signal should be selected to be approximately larger than 0.14 in order to reproduce a stable tracking servo signal or a wobbling signal when focusing is fine adjusted in order to maximize a push-pull signal amount.

Having examined measured results on the table 1, it is to be understood that the optical recording and reproducing mediums A to F could obtain stable tracking servo signals on the whole except the portions that could not be reproduced.

On the other hand, of the optical recording and reproducing mediums A to F, optical recording and reproducing mediums in which the groove widths fall within a range of 125 nm to 190 nm had areas in which address information of wobbling grooves can be reproduced stably. It is to be noted that address information could not always be stably reproduced from an area in which the groove width is 220 nm.

When information was recorded on and reproduced from the regions in which address information of wobbling groove can be reproduced stably, i.e. the upper surface of the groove 2 near the reproducing light irradiated side of the optical recording and reproducing mediums A to F in which the groove widths are 125 nm, 160 nm and 190 nm by 1-7 modulation, information could be reproduced from the whole information surface of the optical recording and reproducing medium with jitter of less than 10% and satisfactory recording and reproducing characteristics could be realized.

From these results, it is to be understood that, in the optical recording and reproducing medium using the wobbling groove recording format of narrow track pitch of 320 nm, when the groove depth is selected to be greater than 17 nm and less than 55 nm, i.e. wavelength λ=406 nm, refractive index n=1.48, phase depth is selected to be greater than λ/16.14 n and less than λ/4.99, groove width is selected to be greater than 125 nm and less than 190 nm, accordingly, the ratio between the groove width and track pitch is selected to be greater than 0.391 and less than 0.594, groove shapes become optimum shapes without deteriorating recording and reproducing characteristics and recording density can be increased and storage capacity can be increased while satisfactory recording and reproducing characteristics are being held.

Further, there were manufactured optical recording and reproducing mediums G to J in which groove depths were 99 nm, 103 nm, 111 nm and 114 nm by changing the thickness of the photoresist. Also in this case, by changing power of recording laser light irradiated on the master discs of the respective optical recording and reproducing mediums, the groove widths were selected to be 135 nm, 155 nm, 175 nm and 185 nm and information was recorded. Then, the amounts of push-pull signals were measured by the above-mentioned optical recording and reproducing apparatus. Measured results are shown on the following table 2.

TABLE 2

| | Groove depth [nm] | Phase depth λ/(d · n) | Groove width [nm] (numerical values in parentheses denote groove width/track pitch) | | | |
|---|---|---|---|---|---|---|
| | | | 135 (0.422) | 155 (0.484) | 175 (0.547) | 185 (0.578) |
| G | 99 | 2.77 | 0.134 | 0.142 | 0.138 | 0.134 |
| H | 103 | 2.66 | 0.14 | 0.148 | 0.146 | 0.14 |
| I | 111 | 2.47 | 0.14 | 0.148 | 0.144 | 0.14 |
| J | 114 | 2.41 | 0.134 | 0.14 | 0.138 | 0.134 |

Stable tracking servo signals could be obtained from the whole surfaces of these optical recording and reproducing mediums. Further, when address information of wobbling grooves were reproduced, although error rates in reproduction were deteriorated in the regions in which the groove widths of the optical recording and reproducing mediums G and J were 135 nm and 185 nm, address information could be reproduced stably. Specifically, it is to be understood that the areas in which address information can be reproduced stably are the areas in which the groove widths of the optical recording and reproducing mediums G to J are greater than 135 nm and less than 185 nm.

Accordingly, it is to be understood that, in the optical recording and reproducing mediums using the wobbling groove recording format of the narrow track pitch of 320 nm, when the groove depth is selected to be greater than 99 nm and less than 114 nm, i.e. wavelength λ=406 nm, refractive index n=1.48, phase depth is selected to be greater than λ/2.77 and less than λ/2.41, further, the groove width is selected to be greater than 135 nm and less than 185 nm and the ratio between the groove width and the track pitch is selected to be greater than 0.422 and less than 0.578, groove shapes become optimum shapes without deteriorating recording and reproducing characteristics and recording density can be increased and storage capacity can be increased while satisfactory recording and reproducing characteristics are being held.

When information is recorded on and reproduced from the wobbling groove portions of the whole surfaces of the optical recording and reproducing mediums G to J, i.e. the recording areas near the light entrance end side by 1-7 modulation system, it is to be noted that information could be reproduced from the whole surface of the disc with jitter of less than 12% and that excellent recording and reproducing characteristics could be realized.

While all track pitches of the grooves are set to 320 nm in the above-mentioned respective examples, there were manufactured optical recording and reproducing mediums in which the track pitches were selected to be 300 nm, 310 nm, 315 nm, 325 nm, the groove depth was selected to be 34 nm, accordingly, the phase depth is selected to be λ/8.07 n and the ratio w/p between the groove width and the track pitch was selected to be 0.5, and the amplitudes of the push-pull signals were measured. Measured results are shown on the following table 3 including measured results of the optical recording and reproducing medium in which the track pitch was selected to be 320 nm.

TABLE 3

| Track pitch [nm] | Groove depth [nm] | Phase depth λ/(d · n) | Signal amount |
|---|---|---|---|
| 325 | 34 | 8.07 | 0.23 |
| 320 | 34 | 8.07 | 0.22 |
| 315 | 34 | 8.07 | 0.20 |
| 310 | 34 | 8.07 | 0.18 |
| 300 | 34 | 8.07 | 0.14 |

From these measured results, it is to be noted that when the track pitch was selected to be 310 nm, the phase depth of the groove was approximately λ/8 n and the signal amount was 0.18 and that when the track pitch was microminiaturized to 300 nm, the phase depth of the groove was similarly λ/8 n and the signal amount was decreased to 0.14, which was the lower limit of the reproduction of the wobble signal in actual practice. Accordingly, it is to be that, when the track pitch is selected to be understood than 300 nm and less than 325 nm, more preferably, the track pitch is selected to be greater than 310 nm and less than 325 nm, the wobbling signal can be reproduced stably.

Further, while the track pitch was being changed in a range of from 300 nm to 325 nm under the condition that the groove depth was selected to be 103 nm, i.e. the phase depth was selected to be λ/2.66 n and that the ratio w/p between the groove width and the track pitch was selected to be 0.5, there were manufactured optical recording and reproducing mediums, and amplitudes of push-pull signals thereof were measured. Measured results are shown on the following table 4.

TABLE 4

| Track pitch [nm] | Groove depth [nm] | Phase depth λ/(d · n) | Signal amount |
|---|---|---|---|
| 325 | 103 | 2.66 | 0.155 |
| 320 | 103 | 2.66 | 0.15 |
| 315 | 103 | 2.66 | 0.145 |
| 310 | 103 | 2.66 | 0.14 |
| 300 | 103 | 2.66 | 0.137 |

From these measured results, it is to be noted that when the track pitch was selected to be 310 nm, the phase depth of the groove was λ/2.66 n and the signal amount was 0.14 and that when the track pitch was selected to be 300 nm, the signal amount was further decreased to 0.137, which was the lower limit of the reproduction of the wobble signal in actual practice.

That is, from the measured results on the above-mentioned tables 3 and 4, it becomes clear that, when the phase depth was selected to be approximately λ/8 n and when the phase depth was selected to be approximately λ/2.66 n, if the track pitch is selected to be greater than 300 nm and less than 325 nm, then a practical wobble signal can be obtained and that, more preferably, if the track pitch is selected to be greater than 310 nm and less than 325 nm, then a stable wobble signal can be reproduced.

As described above, when the optical recording and reproducing medium has the arrangement according to the present invention, the track density substantially the same as that of the aforementioned land groove recording system can be obtained so that the recording density as high as about twice the recording density in the prior art can be obtained. In addition, unlike the land groove recording system, a plurality of focal points need not be set upon reproduction and recording and reproducing characteristics can be prevented from being fluctuated.

Specifically, in the optical recording and reproducing apparatus using the optical recording and reproducing medium according to the present invention, since this optical recording and reproducing apparatus has the arrangement in which recording information can be recorded on and reproduced from the projecting upper surface of the groove with irradiation of reproducing light from the protective layer side, the recording density can be increased to be as high as about twice the recording density of the prior art without causing the optical system to become complicated while satisfactory recording and reproducing characteristics are being held.

While the embodiments of the present invention and the respective inventive examples have been described so far, the present invention is not limited to the above-mentioned embodiments and inventive examples, and the materials of the respective layers such as the recording layer made of the phase-change material of the optical recording and reproducing medium, for example, can be varied. It is needless to say that the present invention can be modified without departing from the scope of the present invention in various manners such as when a magneto-optical recording layer and a dye material layer are used as a recording layer and materials of substrate and arrangement of substrate are varied.

Further, information is not limited to the recording information and the present invention may be applied to an optical recording and reproducing medium, an optical recording and reproducing medium manufacturing mother stamper and an optical recording and reproducing apparatus which can function to record and reproduce information or which can function to record and reproduce both of information and signals.

As described above, according to the present invention, even when the optical recording and reproducing medium has grooves of narrow track pitch capable of increasing recording density as high as about twice the recording density of the prior art, if an optimum groove shape is used, then it is possible to provide an optical recording and reproducing medium with high recording density and an optical recording and reproducing apparatus with high recording density in which information or both of information and signals can be recorded and reproduced reliably and stably while satisfactory recording and reproducing characteristics can be held and the optical system can be avoided from becoming complicated in structure.

Further, when the optical recording and reproducing medium is provided with wobbling grooves, address information can be stably reproduced from the wobbling grooves. Hence, it is possible to provide a high-density optical recording and reproducing medium with excellent recording and reproducing characteristics in which wobble signals can be reproduced from all recording areas and an optical recording and reproducing apparatus using this high-density optical recording and reproducing medium.

The invention claimed is:

1. An optical recording and reproducing medium comprising:

grooves formed along recording tracks and which can be recorded and/or reproduced with irradiation of light having a predetermined wavelength λ, wherein, when n assumes a refractive index of a medium extending from a light entrance end face to said grooves of said optical recording and reproducing medium, a phase depth x of said groove satisfies the following inequality, $x=\lambda/(d\cdot n)$ in which d is a depth of the grooves:

$$\lambda/16.14n \leq x \leq \lambda/4.99n$$

and that a ratio w/p of a width w of said groove and a track pitch p satisfies the following inequality:

$$0.391(w/p) \leq 0.594,$$

wherein the width w of said grooves is 135 nm to 185 nm and the depth of the grooves d is 99 nm to 114 nm;

at least a recording layer and a protective layer formed on a substrate in which said grooves are formed and wherein said groove includes an upper surface projecting to the side near said light entrance end face and said upper surface of said groove serves as an information surface in which information is recorded and reproduced, wherein said grooves are formed as wobbling grooves, wherein said track pitch is greater than 300 nm and less than 325 nm, and wherein when NA assumes a numerical aperture of an objective lens for use in recording and/or reproducing said optical recording and reproducing medium, said NA lies in the ranges of 0.85±0.05.

2. An optical recording and reproducing medium comprising:

grooves formed along recording tracks and which can be recorded and/or reproduced with irradiation of light having a predetermined wavelength λ, wherein, when n assumes a refractive index of a medium extending from a light entrance end face to said grooves of said optical recording and reproducing medium, a phase depth x of said grooves satisfies the following inequality, $x=\lambda/(d\cdot n)$ in which d is a depth of the grooves:

$$\lambda/2.77n \leq x \leq \lambda/2.41n$$

and that a ratio w/p of a width w of said groove and a track pitch p satisfies the following inequality:

$$0.422 \leq (w/p) \leq 0.578,$$

wherein the width w of said grooves is 135 nm to 185 nm and the depth of the grooves d is 99 nm to 114 nm;

at least a recording layer and a protective layer formed on a substrate in which said grooves are formed and wherein said groove includes an upper surface projecting to the side near said light entrance end face and said upper surface of said groove serves as an information surface in which information is recorded and reproduced, wherein said grooves are formed as wobbling grooves, wherein said track pitch is greater than 300 nm and less than 325 nm, and wherein when NA assumes a numerical aperture of an objective lens for use in recording and/or reproducing said optical recording and reproducing medium, said NA lies in the ranges of 0.85±0.05.

3. An optical recording and reproducing medium manufacturing mother stamper for use in manufacturing an optical recording and reproducing medium having grooves formed along recording tracks and which can be recorded and/or reproduced with irradiation of light having a predetermined wavelength λ, wherein, when n assumes a refractive index of a medium extending from a light entrance end face to said grooves of said optical recording and reproducing medium, a phase depth x' of a groove pattern corresponding to said grooves satisfies the following inequality, x'=λ/(d·n) in which d is a depth of the grooves:

$$\lambda/16.14n \leq x' \leq \lambda/4.99n$$

and that a ratio w'/p' between a width w' of said groove pattern and a track pitch p satisfies the following inequality:

$$0.391 \leq (w'/p') \leq 0.594,$$

wherein the width w of said grooves is 135 nm to 185 nm and the depth of the grooves d is 99 nm to 114 nm; and wherein said groove pattern is formed as a wobbling groove pattern.

4. An optical recording and reproducing medium manufacturing mother stamper for use in manufacturing an optical recording and reproducing medium having grooves formed along recording tracks and which can be recorded and/or reproduced with irradiation of light having a predetermined wavelength λ, wherein, when n assumes a refractive index of a medium extending from a light entrance end face to said grooves of said optical recording and reproducing medium, a phase depth x' of a groove pattern corresponding to said grooves satisfies the following inequality, x'=λ/(d·n) in which d is a depth of the grooves:

$$\lambda/2.77n \leq x' \leq \lambda/2.41n$$

and that a ratio w'/p' of a width w' of a groove pattern and a track pitch p' satisfies the following inequality:

$$0.422 \leq (w'/p') \leq 0.578,$$

wherein the width w of said grooves is 135 nm to 185 nm and the depth of the grooves d is 99 nm to 114 nm; and wherein said groove pattern is formed as a wobbling groove pattern.

5. An optical recording and reproducing medium comprising:

grooves formed along recording tracks and which can be recorded and/or reproduced with irradiation of light having a predetermined wavelength λ, wherein an optical recording and reproducing medium uses a substrate transfer-molded by a mother stamper in which, when n assumes a refractive index of a medium extending from a light entrance end face to said grooves of said optical recording and reproducing medium, a phase depth x' of a groove pattern corresponding to said groove satisfies the following inequality, x'=λ/(d·n) in which d is a death of the grooves:

$$\lambda/16.14n \leq x' \leq \lambda/4.99n$$

and in which a ratio w'/p' between a width w' of said groove pattern and a track pitch p' satisfies the following inequality;

$$0.391 \leq (w'/p') \leq 0.594$$

that said substrate has at least a recording layer and a protective layer and that said groove has an upper surface projecting to the side near said light entrance end face and said upper surface is an information surface in which information can be recorded and reproduced, wherein the width w of said grooves is 135 nm to 185 nm and the depth of the grooves d is 99 nm to 114 nm, and wherein said grooves are formed as wobbling grooves.

6. An optical recording and reproducing medium comprising:

grooves formed along recording tracks and which can be recorded and/or reproduced with irradiation of light having a predetermined wavelength λ, wherein said optical recording and reproducing medium uses a substrate transfer-molded by a mother stamper in which, when n assumes a refractive index of a medium extending from a light entrance end face to said grooves of said optical recording and reproducing medium, a phase depth x' of a groove pattern corresponding to said groove satisfies the following inequality, x'=λ/(d·n) in which d is a depth of the grooves:

$$\lambda/2.77n \leq x' \leq \lambda/2.41n$$

and that a ratio w'/p' between a width w' of said groove pattern and a track pitch p' satisfies the following inequality:

$$0.422 \leq (w'/p') \leq 0.578$$

that said substrate has at least a recording layer and a protective layer formed thereon and that said groove has an upper surface projecting to the side near said light entrance end face and said upper surface is an information surface in which information is recorded and reproduced, wherein the width w of said grooves is 135 nm to 185 nm and the depth of the grooves d is 99 nm to 114 nm, and wherein said grooves are formed as wobbling grooves.

7. An optical recording and reproducing apparatus for use with an optical recording and reproducing medium having grooves formed along recording tracks and which can be recorded and/or reproduced with irradiation of light having a predetermined wavelength λ, wherein said optical recording and reproducing medium has an arrangement such that, when n assumes a refractive index of a medium extending from a light entrance end face to said grooves of said optical recording and reproducing medium, a phase depth x of said groove satisfies the following inequality, x=λ/(d·n) in which d is a depth of the grooves:

$$\lambda/16.14n \leq x \leq \lambda/4.99n$$

and a ratio w/p between a width w of said groove and a track pitch p satisfies the following inequality:

$$0.391 \leq (w/p) \leq 0.594$$

and that information is recorded on and reproduced from only an upper surface near said light entrance end face of said groove, wherein the width w of said grooves is 135 nm to 185 nm and the depth of the grooves d is 99 nm to 114 nm, wherein said groove is formed as a wobbling groove and wobbling information is reproduced from said wobbling groove, wherein said track pitch of said groove is selected to be greater than 300 nm and less than 325 nm, and wherein when NA assumes a numerical aperture of an objective lens for use in recording and/or reproducing said optical recording and reproducing medium, said NA lies in the range of 0.85±0.05.

8. An optical recording and reproducing apparatus for use with an optical recording and reproducing medium having grooves formed along recording tracks and which can be recorded and/or reproduced with irradiation of light having a predetermined wavelength λ, wherein said optical recording and reproducing medium has an arrangement in which when n assumes a refractive index of a medium extending from a light entrance end face to said grooves of said optical recording and reproducing medium, a phase depth x of said groove satisfies the following inequality, $x = \lambda/(d \cdot n)$ in which d is a depth of the grooves:

$$\lambda/2.77n \leq x \leq \lambda/2.41n$$

and a ratio w/p of a width w of said groove and a track pitch p satisfies the following inequality:

$$0.422 \leq (w/p) \leq 0.578$$

and in which information is recorded on and reproduced from said groove at its upper surface near said light entrance end face, wherein the width w of said grooves is 135 nm to 185 nm and the depth of the grooves d is 99 nm to 114 nm, wherein said groove is formed as a wobbling groove and wobbling information is reproduced from said wobbling groove, wherein said track pitch of said groove is selected to be greater than 300 nm and less than 325 nm, and wherein when NA assumes a numerical aperture of an objective lens for use in recording and/or reproducing said optical recording and reproducing medium, said NA lies in the range of 0.85±0.05.

* * * * *

UNITED STATES PATENT AND TRADEMARK OFFICE
CERTIFICATE OF CORRECTION

PATENT NO. : 7,242,662 B2
APPLICATION NO. : 10/362220
DATED : July 10, 2007
INVENTOR(S) : Sohmei Endoh et al.

It is certified that error appears in the above-identified patent and that said Letters Patent is hereby corrected as shown below:

Column 17, line 14, change "$\lambda/116.14n \leqq x' \leqq \lambda/4.99n$" to
--$\lambda/16.14n \leqq x' \leqq \lambda/4.99n$--;
line 58, change "death" to --depth--.

Signed and Sealed this

Thirteenth Day of May, 2008

JON W. DUDAS
*Director of the United States Patent and Trademark Office*